United States Patent
Steegmans

(10) Patent No.: US 6,799,216 B2
(45) Date of Patent: Sep. 28, 2004

(54) SYSTEM USES DOMAIN MANAGERS TO COMMUNICATE SERVICE PARAMETERS TO DOMAIN BOUNDARY CONTROLLERS FOR MANAGING SPECIAL INTERNET CONNECTIONS ACROSS DOMAIN BOUNDARIES

(75) Inventor: Frank Steegmans, Deurne (BE)

(73) Assignee: Alcatel, Paris (FR)

( * ) Notice: Subject to any disclaimer, the term of this patent is extended or adjusted under 35 U.S.C. 154(b) by 831 days.

(21) Appl. No.: 09/731,708

(22) Filed: Dec. 8, 2000

(65) Prior Publication Data

US 2003/0191834 A1 Oct. 9, 2003

(30) Foreign Application Priority Data

Dec. 10, 1999 (EP) .............................. 99440352

(51) Int. Cl.$^7$ ................................ G06F 15/16

(52) U.S. Cl. ..................... 709/228; 709/229; 709/225; 709/226

(58) Field of Search ................ 709/229, 228, 709/225, 226; 370/468, 352, 323, 230, 395.31, 392, 231, 232

(56) References Cited

U.S. PATENT DOCUMENTS

| | | | | | |
|---|---|---|---|---|---|
| 5,982,748 | A | * | 11/1999 | Yin et al. | 370/232 |
| 6,097,699 | A | * | 8/2000 | Chen et al. | 370/231 |
| 6,167,028 | A | * | 12/2000 | Harris | 370/230 |
| 6,363,065 | B1 | * | 3/2002 | Thornton et al. | 370/352 |
| 6,442,138 | B1 | * | 8/2002 | Yin et al. | 370/232 |
| 6,449,275 | B1 | * | 9/2002 | Andersson et al. | 370/395.31 |
| 6,594,279 | B1 | * | 7/2003 | Nguyen et al. | 370/468 |
| 6,680,943 | B1 | * | 1/2004 | Gibson et al. | 370/392 |

OTHER PUBLICATIONS

"TINA Service Architecture" by A. Conchon et al., published in the magazine "Alcatel Telecommunication Review", $1^{st}$ Quarter 1998.

Stefani, J.: "Open distributed processing: an architectural basis for information networks" Computer Communications, NL, Elsevier Science Publishers BV, Amsterdam, vol. 18, No. 11, Nov. 1, 1995, pp. 849–862, CP004032440 ISSN: 0140–3664.

Marshall, I. W. et al.: "The Information Services Supermarket an Information Network Prototype" BT Technology Journal, GB, BT Laboratories, vol. 13, No. 2, Apr. 1, 1995, pp. 132–142, XP000500765 ISSN: 1358–3948.

Larsen, A. K: "All eyes on IP Traffic. New Apps can monitor Internet and Intranet Traddic, But do they deliver enough data to hold ISPS to their promises?" Data Communications, US, Mcgraw Hill, New York, vol. 26, No. 4, Mar. 21, 1997, pp. 54, 56–60, 62, XP000659549 ISSN: 0363–6399.

* cited by examiner

Primary Examiner—Le Hien Luu
(74) Attorney, Agent, or Firm—Sughrue Mion, PLLC

(57) ABSTRACT

A system for managing Internet connections routed across an internet communications network comprising two or more domains. Each domain is provided with a domain manager and with one or more domain boundary controller(s). To assure the service quality of Internet connections, the domain manager communicates with the domain boundary controllers of the domain to which it is assigned and, by transferring service parameters, authorizes these domain boundary controllers to establish and maintain special Internet connections under special conditions across the boundary of the domain into the domain. The domain boundary controllers monitor the establishment of internet connections across the boundary of their particular domain into their particular domain and permit the establishment and maintenance of internet connections across the boundary of their domain into their domain only for those special internet connections, and under those special conditions.

15 Claims, 5 Drawing Sheets

SYSTEM USES DOMAIN MANAGERS TO COMMUNICATE SERVICE PARAMETERS TO DOMAIN BOUNDARY CONTROLLERS FOR MANAGING SPECIAL INTERNET CONNECTIONS ACROSS DOMAIN BOUNDARIES

BACKGROUND OF THE INVENTION

The invention relates to a system for managing internet connections routed across an internet communications network comprising two or more domains, and to a domain manager and a domain boundary controller for supporting the management of internet connections routed across an internet communications network comprising two or more domains.

The invention is based on the present-day standard management of internet connections on the internet in which the service quality of internet connections is assured by the introduction of new protocols which influence the routing and switching of internet connections in part up to layer 3 of the OSI protocol stack (OSI=Open System Interconnection).

Service platforms are also known, such as the TINA service platform (TINA=Telecommunications Information Network Architecture) described for example in the article "TINA Service Architecture" by A. Conchon et al., published in the magazine "Alcatel Telecommunication Review", 1st Quarter 1998.

In addition to providing an IT platform for telecommunications services, a service architecture and TINA services, TINA also provides a business model. This business model allows different roles supported by the TINA architecture to be allocated to the various participants in the provision of a service. As a result, charge metering of the services provided by the various participants is also supported by the TINA architecture. The TINA platform thus offers a type of marketplace for services and networks.

SUMMARY OF THE INVENTION

The object of the invention is to facilitate the provision of a specific service quality for specific internet connections within an internet communications network.

This object is achieved by a system according to the invention for managing internet connections, a domain manager according to the invention for supporting the management of internet connections, and a domain boundary controller according to the invention for supporting the management of internet connections.

Each domain is provided with a domain manager assigned thereto for managing the service quality for internet connections within the particular domain and with one or more domain boundary controllers for monitoring the boundary of the particular domain. The domain manager is designed such that, to assure the service quality of internet connections, it communicates with the domain boundary controllers of the particular domain to which it is assigned and, by transferring service parameters, authorises these domain boundary controllers to permit the establishment and maintenance of special internet connections under special conditions across the boundary of the domain into the domain. The domain boundary controllers are in each case designed such that they monitor the establishment of internet connections across the boundary of their particular domain into their particular domain and permit the establishment and maintenance of internet connections across the boundary of their domain into their domain only for those special internet connections, and under those special conditions, for which they have been authorised by the domain manager assigned to their domain.

This concept is not limited to internet as network technology but can be applied for any connetionless network technology (i.e. X.25).

The advantage of the invention consists in that it facilitates an effective and comprehensive assurance of service quality for internet connections. The invention enables service quality for internet connections to be introduced on a broad basis on the internet without having to accept the disadvantage of allocating all the available resources for this purpose.

Moreover, the distributed architecture of the system according to the invention facilitates an improvement in the average service quality available for internet connections by optimising the utilization of resources while nevertheless minimising the computation- and coordination outlay required for this purpose.

Advantageous developments of the invention are described in the sub-claims.

It is particularly advantageous to implement the domain manager as a TINA component which interacts with other TINA components on a TINA platform. If both ends of an internet connection are assigned the roles of parties in a TINA service session initiating the provision of the resources for this connection on the internet, it is possible for all the users of an internet connection to be debited with the charges incurred in the overall system for the service quality which they have requested.

It is also advantageous to initiate the provision of a specific service quality for a specific internet connection by means of a TINA service session assigned to this internet connection. It is also advantageous to manage the infrastructure and charge metering of the allocation of resources by means of the TINA business model.

It is also advantageous that the domain manager manages all the resources required by internet connections within the domain to which it is assigned. This permits the dynamic assignment of network resources to users, as well as the implementation of security checks and charge metering for these resources.

It is also advantageous that other TMN tasks (TMN= Telecommunication Network Management) than configuration and accounting management can be performed by this concept. Such tasks are for example fault management, performance management and security management.

BRIEF DESCRIPTION OF THE DRAWINGS

In the following the invention will be explained by way of example in the form of a plurality of exemplary embodiments making reference to the attached drawings in which.

DETAILED DESCRIPTION OF THE INVENTION

Figure 1:
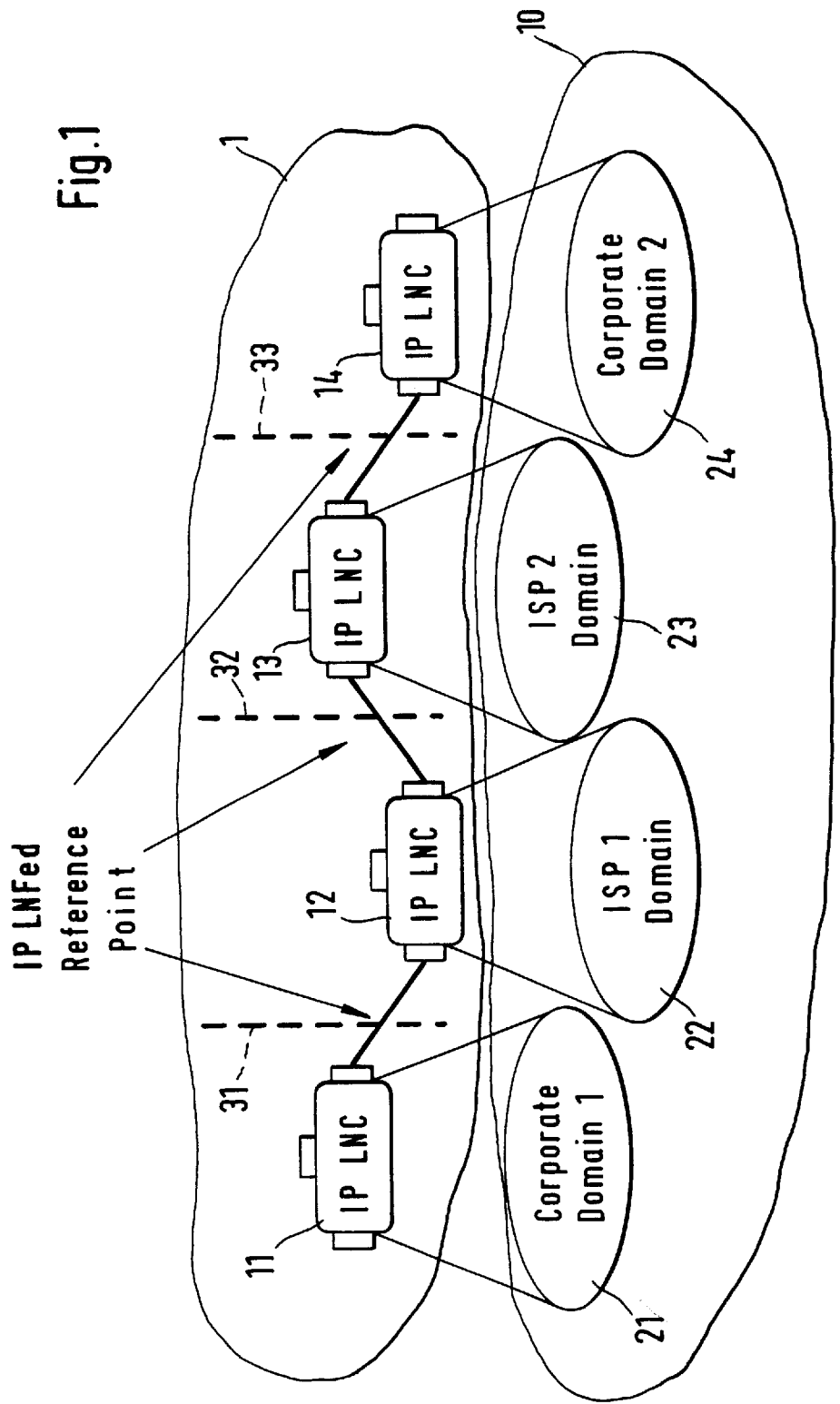
FIG. 1 is a block circuit diagram of an internet communications network with a system according to the invention for managing internet connections.

FIG. 1 illustrates an internet communications network 10 and a system 1 for managing internet connections of the components of the system 1, FIG. 1 shows four domain managers 11 to 14 (IP LNC=IP Layer Network Coordinator).

The internet communications network 10 is formed by a plurality of interconnected physical communications networks using an IP protocol (IP=Internet Protocol) as common layer 3 protocol.

The internet communications network 10 illustrated in FIG. 1 comprises, for example, four domains 21 to 24 each constituting a logic portion of the internet communications network 10. Advantageously, the domains 21 to 24 are each formed by a logic sub-network of the communications network 10 which is managed by a network manager or assigned to a network operator.

Each of the domains 21 to 24 is assigned a respective domain manager which manages the provision of service quality for internet connections within the particular domain. The domain managers 11, 12, 13 and 14 are thus in each case assigned to the domains 21 to 24.

The domain managers 11, 12, 13, and 14 are each formed by one or more computer(s) which are interconnected via a computer network and whose software platform runs applications programs which provide and control the functions, to be described in the following, of a domain manager. It is of course also possible for the domain managers 11, 12, 13 and 14 to in each case consist of a virtual software component formed by one or more applications program(s). These virtual software components can then run, together with other software components which for example perform network management functions, on a common hardware platform or distributed between a plurality of computers. A plurality of software components, each of which represents a domain manager assigned to a different domain, can also run on a common hardware platform.

The domain managers 11, 12, 13 and 14 in each case communicate with one another via identical, standardized reference points 31 to 33 (IP LNGrf Reference Point=IP Layer Network Federation Reference Point). The reference points 31 to 33 here describe all the interfaces and the information exchange necessary between adjacent domain managers for the management of common internet connections and the initiation of internet connections across the domain boundaries. The domain managers 11, 12, 13 and 14 thus communicate with one another in accordance with the reference points 31 to 33 using one or more first protocol(s).

The detailed construction and functioning of the system 1 for managing internet connections will now be explained by way of an example on the basis of the domain 22 making reference to FIG. 2.

Figure 2:
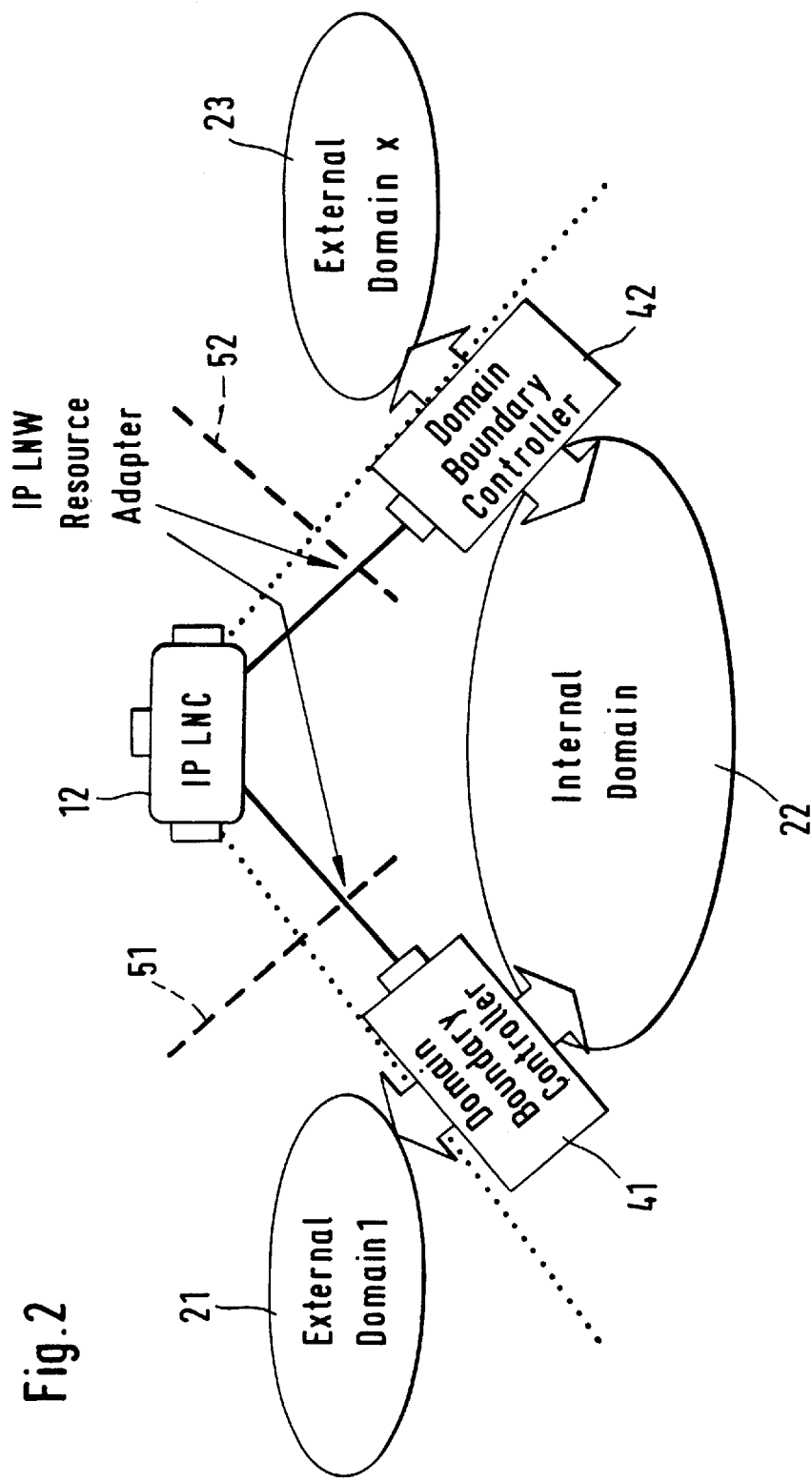
FIG. 2 is a more detailed block circuit diagram of the system according to the invention for managing internet connections as shown in FIG. 1.

FIG. 2 shows the domains 21 to 23, the domain manager 12 and two domain boundary controllers (DBCs) 41 and 42 which likewise form part of the system 1 for managing internet connections.

The domain boundary controllers 41 and 42 are assigned to the domain 22 and monitor the domain boundary of this domain. The number of domain boundary controllers has been selected by way of an example in FIG. 2. The domain boundary controllers 41 and 42 are each formed by one or more, distributed, physical as well as logic units(s). The software platform of these units runs applications programs which provide the functions, to be described in the following, of the domain boundary controllers 41 and 42 by controlling the peripheral assemblies of the units.

The domain manager 12 in each case communicates with the domain boundary controllers 41 and 42 via identical standardized reference points 51 and 52 (IP LNW Resource Adapter=IP Layer Network Resource Adapter). The reference points 31 to 33 here describe all the interfaces and the information exchange possible between a domain manager and resources of the domain. The communication between the domain manager 12 and other resources of the domain 22 can thus also take place via such a reference point. The domain manager 12 therefore communicates with resources of the domain 22, for example the domain boundary controllers 41 and 42, in accordance with the reference points 51 and 52 using one or more second protocol(s)

The domain manager 12 serves to support the management of internet connections routed across the internet communications network 10. Here the domain manager 12 manages the service quality of internet connections within the domain 22, which it is assigned, of the internet communications network 10.

It is also advantageous that the domain manager 12 communicates with the domain managers 11 and 13 of the adjacent domains 21 and 23 and exchanges information therewith for the management of common internet connections which are routed both through the domain 22 of the domain manager 12 and through the domains 21 and 23 of the in each case adjacent domain managers 11 and 13. In that the domain manager 12 communicates with the domain manager of an adjacent domain, for example with the domain manager 13 of the domain 23, it can initiate the establishment of an internet connection across the domain boundary into the domain of this domain manager.

If we only consider IP packets up till layer 3—hence not taking into account any session or application related information—a connection is defined as a set of header parameters of IP packets. For establishment of a connection we have to configure the domain boundary controllers of one or several domains to allow IP packets belonging to the same connection to pass through. Due to the connectionless nature of IP it is however not certain whether all these packages will follow the exact configured route. I.e. establishing an internet connection in this context means that all the domain boundary controllers are configured in such a way that whatever route the individual IP packages (within the quality of service and security constrains of the connection of course) follow they are recognized as belonging to the connection and are treated according to the quality of service specification of the connection.

To assure the service quality of internet connections, the domain manager 12 communicates with the domain boundary controllers 41 and 42 of the domain 22 which it is assigned. By transferring service parameters, the domain manager 12 authorises the domain boundary controllers 41 and 42 to permit the establishment and maintenance of special internet connections under special conditions across the boundary of the domain 22 into the domain 22. The service parameters transferred from the domain manager 12 to the domain controllers 41 and 42 here specify the conditions under which a special internet connection can be established and maintained across the boundary of the domain 22 into the domain 22.

Here an internet connection is specified by the domain manager 21 by means of its regular IP properties (e.g. source IP, sink IP, protocol, source port, sink port). However it is also possible for internet connections to be additionally specified by higher-level information, for example by their specific URL or MIME type. By means of such additional parameters, which serve for example to configure higher-level resources, such as routers, firewalls or proxies, such resources can be configured by the domain manager 12 for the internet connection specified by these parameters.

It is also advantageous that, in addition to controlling the domain boundary controllers 41 and 42, the domain manager 12 also manages if possible all of the resources required by internet connections within the domain 22 which it is assigned. The domain manager 12 controls the allocation of these resources, which it manages, to internet connections in accordance with the service quality agreed upon for the particular internet connection. This provides the domain manager 12 with an additional means of assuring service quality for these internet connections in the domain 22 which it is assigned.

It is also advantageous that the domain manager 12 communicates by means of a first protocol with the other domain managers 11, 13 and 14 assigned to the other domains and by means of a second, different type of protocol with the domain boundary controllers 41 and 42 of the domain 22 which it is assigned.

The domain boundary controllers 41 and 42 serve to support the management of internet connections routed across the internet communications network 10. The domain boundary controllers 41 and 42 in each case monitor the domain boundary of the domain 22, which they are assigned, of the internet communications network 10. Here the domain boundary controller 41 monitors the domain boundary between the domain 22 and the domain 21. The domain boundary controller 42 monitors the domain boundary between the domain 22 and the domain 23. On the other hand the domain boundary controllers 41 and 42 communicate with the domain manager 12 of the assigned domain 22 which manages the service quality of internet connections within the domain 22 which they are assigned. The domain boundary controllers 41 and 42 monitor the establishment of internet connections across the boundary of their assigned domain 22 into the domain 22. The domain boundary controller 41 here monitors the establishment of internet connections from the domain 21 into the domain 22 and the domain boundary controller 41 monitors the establishment of internet connections from the domain 23 into the domain 22. The domain boundary controllers 41 and 42 also permit the establishment and maintenance of internet connections across the boundary of their assigned domain 22 into the domain 22 only for those special internet connections, and under those special conditions, for which they have been authorised by the domain manager 12 of the assigned domain 22.

The domain boundary controllers 41 and 42 have two main functions within the domain 22: firstly as policing agent and secondly as traffic shaper. The service parameters transferred from the domain manager 12 to the domain boundary controllers 41 and 41 specify the conditions under which a special internet connection can be established and maintained across the boundary of the domain 22 into the domain 22. In such conditions, these service parameters describe how the domain boundary controllers 41 and 42 are to handle a special internet connection.

The service parameters can specify for example the following policing functions for an internet connection, which are then executed by the domain boundary controllers 41 and 42 for these internet connections:

rejection of packets assigned to a specific internet connection when specific limit values are exceeded;

labelling of all or specific packets of a connection to facilitate later differentiation of these packets;

rejection of all packets not assigned to an internet connection forming part of a group of internet connections which can cross the boundary of the domain 22.

In addition, the domain boundary controllers 41 and 42 can comprise components which ensure a special service quality for special internet connections in accordance with the service parameters transferred from the domain boundary manager 12.

Service quality in this sense can constitute a special traffic quality defined by the service parameters; for example the service parameters define a specified constant bit rate, maximum delay and jitter.

To ensure this service quality, the domain boundary controllers 41 and 42 can influence the memory management of the buffer memories which, within the domain 22, serve for the buffer storage of data packets assigned to internet connections. It is also possible for the domain boundary controllers 41 and 42 themselves to be provided with such buffer memories serving for this purpose. The domain boundary controllers 41 and 42 can control the service quality of special internet connections by accessing the memory management of these buffer memories, in particular the control algorithms of the queues and the control priority of the packets of the queues.

Service quality in this sense can also constitute a special quality of security specified by the service parameters. For this purpose the domain boundary controllers 41 and 42 make available security functions which assure different security levels in the domain 22 for different internet connections in accordance with the service parameters.

An alternative construction of the domain boundary manager 12 will now be described with reference to FIG. 3.

Figure 3:
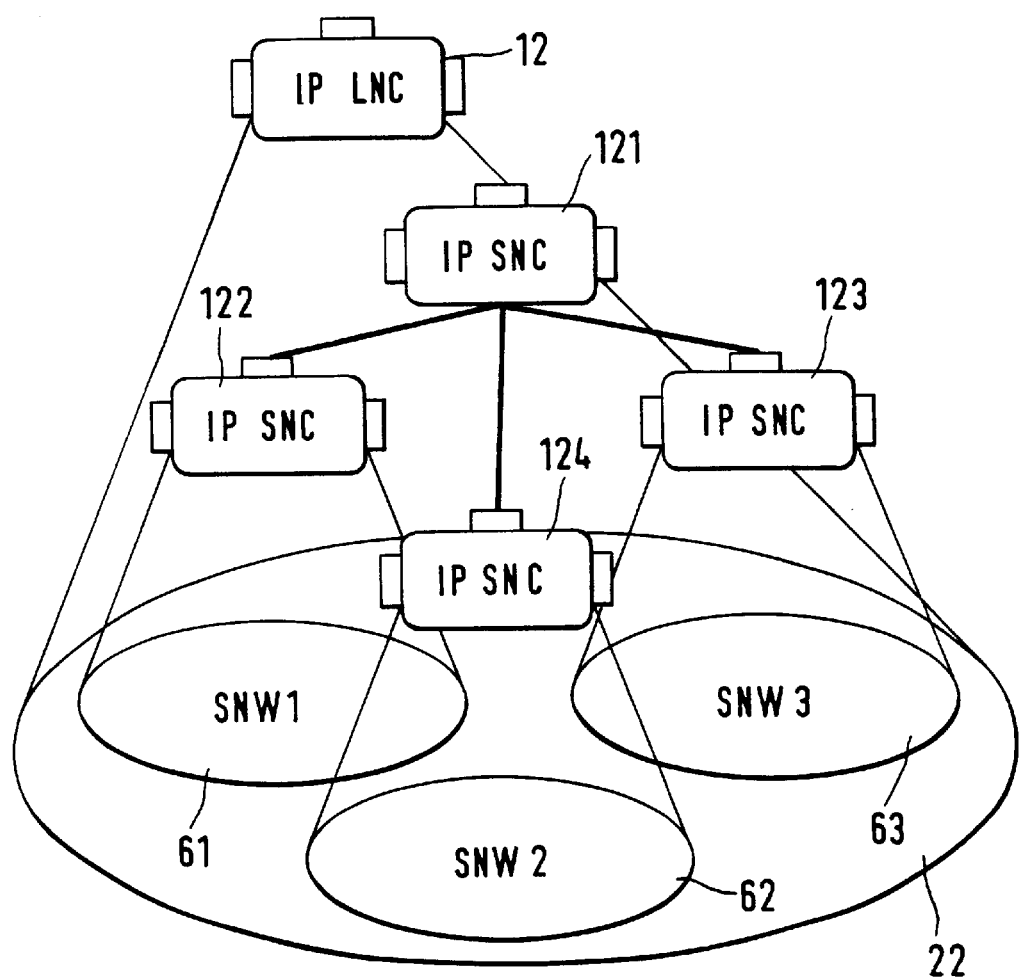
FIG. 3 is a more detailed block circuit diagram of a portion of the system according to the invention for managing internet connections as shown in FIG. 1.

FIG. 3 shows the domain manager 12, the sub-domain managers 121 to 124, the domain 22 and three sub-domains 61 to 63.

The domain manager 12 can also be constructed from a plurality of hierarchically structured sub-domain managers. FIG. 3 shows such an architecture by way of example.

The architecture illustrated in FIG. 3 consists of two stages. The domain 22 is split into the sub-domains 61 to 63, each of which is assigned a sub-domain manager, namely the sub-domain managers 122, 123 and 124. The sub-domain managers 122 to 124 themselves delegate responsibility to the sub-domain manager 121 which oversees the entire domain 22.

It is of course also possible for the domain manager to be constructed from a hierarchy of sub-domain managers consisting of more than two stages.

Sub-domain managers thus communicate on the one hand with the subordinate sub-domain managers which manage the sub-domains collectively forming their particular sub-domain. They also communicate with adjacent sub-domain managers to negotiate about resources at common sub-domain boundaries. They also communicate with network elements of their assigned sub-domain to ensure the service quality of specific internet connections or a group of internet connections within the particular sub-network by means of the configuration of these network elements.

Figure 4:
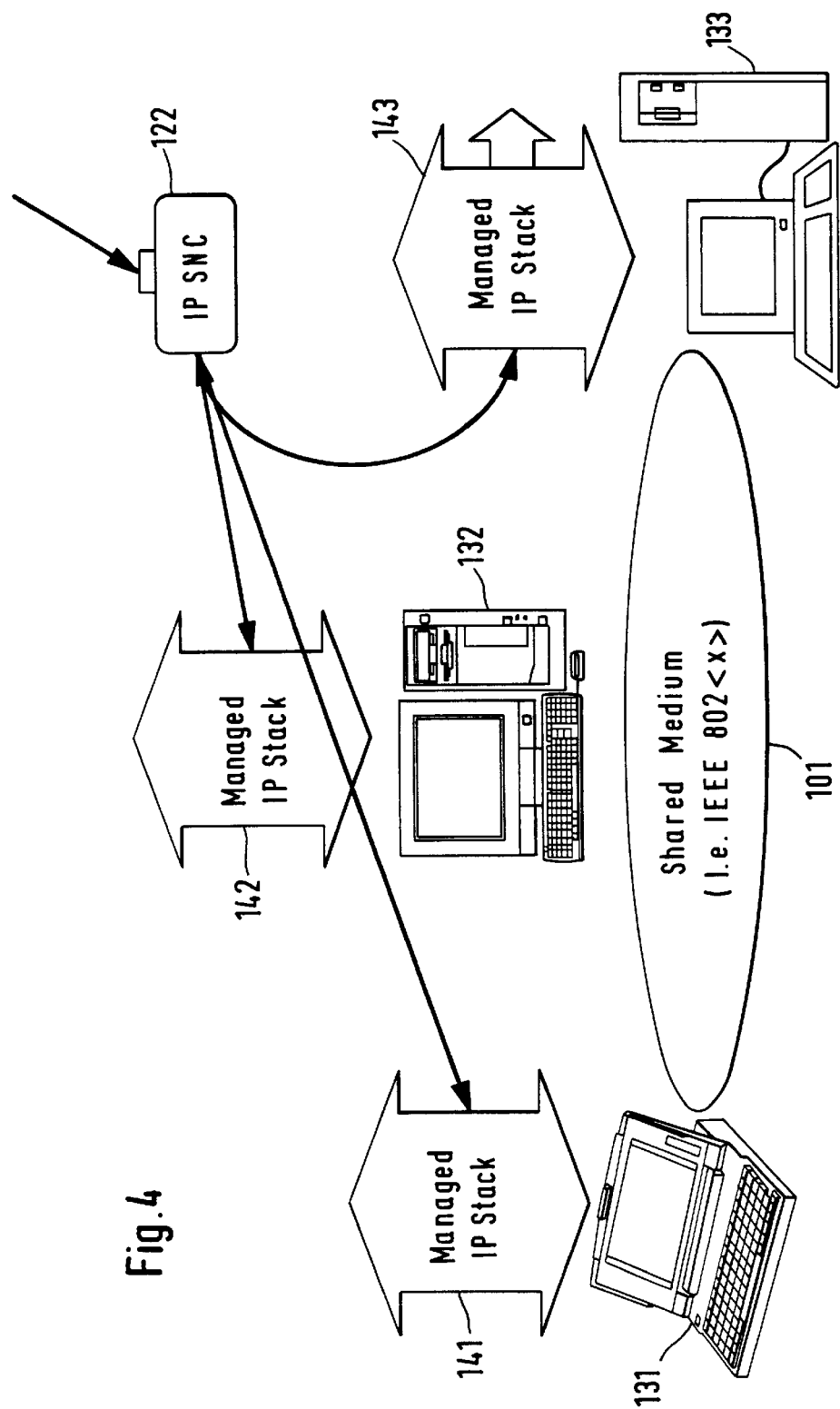
FIG. 4 is a functional diagram of a portion of the system according to the invention for managing internet connections as shown in FIG. 1.

FIG. 4 illustrates how one of the smallest elements of an IP communications network, an IP LAN (LAN=Local Area Network) is managed by a sub-domain manager to ensure the service quality of internet connections within the sub-network.

FIG. 4 illustrates a sub-network 101 of the internet communications network 10, three network elements 131 to 133 with the assigned IP stacks 141 to 143, and the sub-domain manager 122.

The sub-network 101 is an IP LAN. The IP stacks 141 to 143 of the network elements 131 to 133 are modified in such manner that they can be controlled by the sub-domain manager 122. The sub-domain manager 122 can thus change the queues and priorities of the queues from or to specified IP addresses, protocols and ports. This control can take place for example via a CORBA interface (CORBA=Common Object Request Broker Architecture).

The provision of the service quality for an end-to-end internet connection in a system according to the invention as shown in FIG. 1 will now be explained making reference to FIG. 5.

Figure 5:
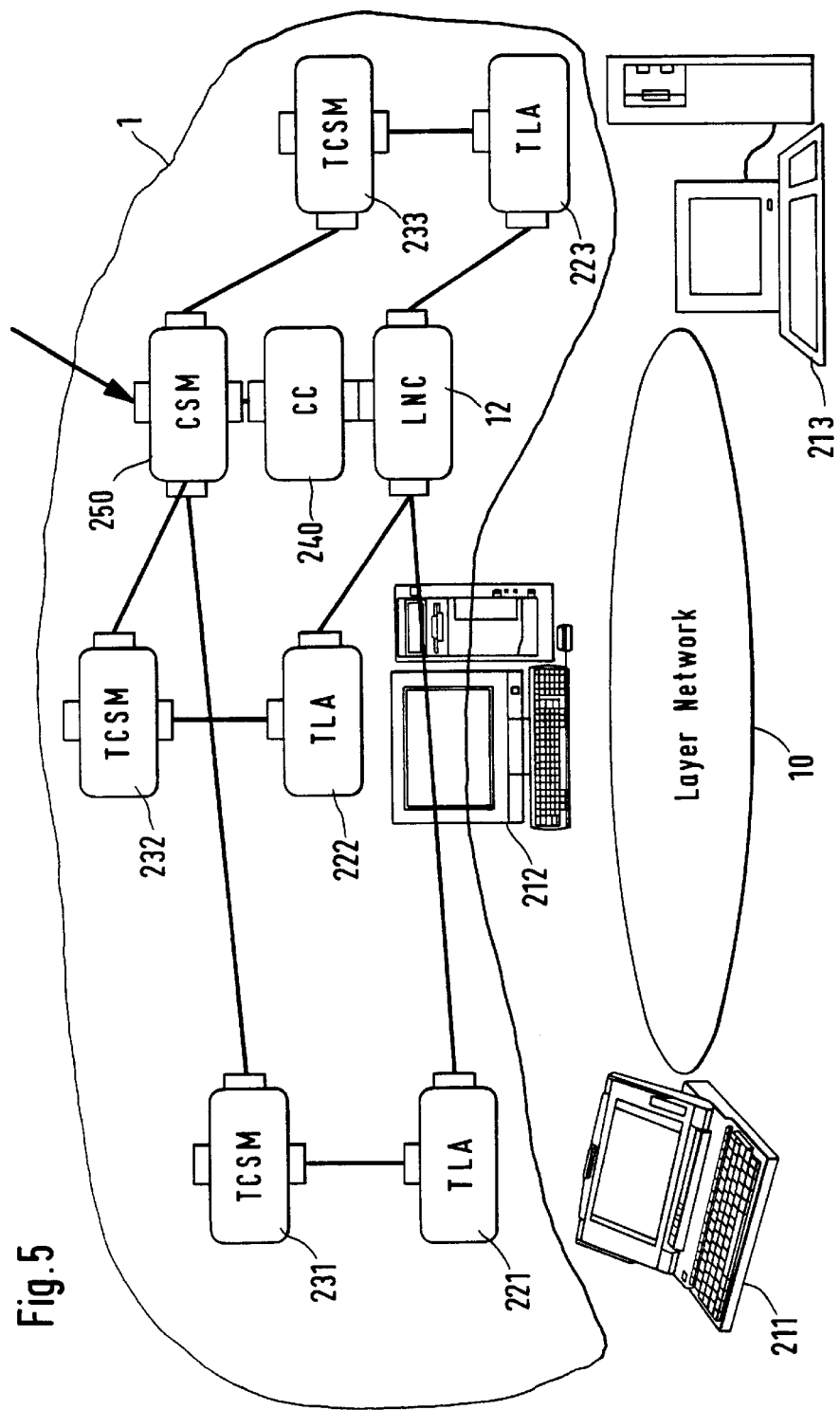
FIG. 5 is a functional diagram of a portion of the system according to the invention for managing internet connections as shown in FIG. 1.

FIG. 5 illustrates the internet communications network 10, three terminals 211 to 213 connected via the internet communications network 10, and the system 1 for managing internet connections. The internet communications network 10 is modelled as a TINA layer network using IP as network technology.

The system 1 is based on a TINA platform. However it is also possible for the system to be based on a a different platform or a different type of SW bus, for example a DCOM platform.

Of the components of the system 1, FIG. 5 shows the domain manager 12, three terminal layer adapters (TLAs) 221 to 223, three terminal communication session managers (TCSMs) 231 to 233, a communication session manager (CSM) 250 and a connection coordinator (CC) 240, which communicate with one another.

The domain manager 12 thus fulfils the function of a component within a TINA architecture, which communicates with other components, the terminal layer adapters 221, 222, 223 and the connection coordinator 240, in accordance with the TINA architecture to provide the service quality for internet connections.

The terminal communication session managers 231 to 233 manage the resources within the respective terminals 211, 212 and 213. They communicate with and control the local hardware managers. They analyze the available resources and communicate about these resources with the service application and the communication session manager 250. The service application can inform the communication session manager 250 of the end-points of an internet connection on a very abstract level, for example can provide the communication session manager 250 with a high quality video source as end-point. This abstract end-point is associated with other end-points at the service level to form an internet connection.

The communication session manager 250 manages a communication session. It thus forms the central contact point of a service which provides for the establishment of an end-to-end internet connection. An end-to-end internet connection also includes the Layers 4 to 7 of the OSI stack. The main function of the communication session manager 250 is making sure these match for all application level end points. After that it will retrieve to which network end point these protocols stacks can be hooked up within the terminal. The setup of the connection between the terminals' network end points is delegated to the connection coordinator 240. The communication session manager 250 makes a request to the connection coordinator 240 for the establishment of the internet connection at the level of a communications network connection.

The terminal layer adapters 221 to 223 manage the endpoints of the internet connection within the terminals 211, 212 and 213.

The domain manager 12 is responsible for the establishment of an internet connection through its particular domain. For this purpose it communicates with the end-points of an internet connection, thus with the terminal layer adapters 221 to 223 when the terminals assigned to these end-points are assigned to its domain 22. It also communicates with the adjacent domain managers when it initiates the establishment of an internet connection through their particular domain. The domain manager 12 shown in FIG. 2 also communicates with the resources of its domain 22 in order to ensure the service quality of the internet connection within its domain.

What is claimed is:

1. A system for managing internet connections routed across an internet communications network (10) comprising two or more domains (21 to 24), characterised in that each domain (21 to 24) is provided with a domain manager (11 to 14) assigned thereto for managing the service quality of internet connections within the particular domain (21 to 24) and with one or more domain boundary controllers (41, 42) for monitoring the domain boundary of the particular domain (22), that the domain manager (12) is designed such that, to ensure the quality of service of internet connections, it communicates with the domain boundary controllers (41, 42) of the particular domain (22) to which it is assigned and, by transferring service parameters, authorises these domain boundary controllers (41, 42) to establish and maintain special internet connections under special conditions across the boundary of the domain (22) into the domain, and that the domain boundary controllers (41, 42) are in each case designed such that they monitor the establishment of internet connections across the boundary of their particular domain (22) into their particular domain and permit the establishment and maintenance of internet connections across the boundary of their domain (22) into their domain only for those special internet connections, and under those special conditions, for which they have been authorised by the domain manager (12) assigned to their domain (22).

2. A system according to claim 1, characterised in that the domain manager (11 to 14) is further designed such that it also communicates with the domain managers (11 to 14) of adjacent domains (21 to 24) and exchanges information therewith for the management of common internet connections which are routed both through the domain of the domain manager and through the domain of the adjacent domain manager.

3. A system according to claim 1, characterised in that the domain manager (12 to 14) is further designed such that it also communicates with the domain manager (12 to 14) of an adjacent domain (21 to 22) and initiates the establishment of an internet connection across the domain boundaries into the domain of this domain manager.

4. A system according to claim 1, characterised in that the domain manager (11 to 14) is further designed such that it manages all the resources required by internet connections within the domain (21 to 24) to which it is assigned and, by allocating these resources to internet connections, assures the service quality of these internet connections in the particular domain (21 to 24).

5. A system according to claim 1, characterised in that the domain manager (21 to 24) is further designed such that it additionally specifies an internet connection by parameters which serve to configure higher-level resources, such as routers, firewalls or proxies.

6. A system according to claim 1, characterised in that each domain boundary controller (41, 42) is further designed such that it implements policing functions for internet connections in accordance with the service parameters transferred from the domain manager (12).

7. A system according to claim 1, characterised in that each domain boundary controller (41, 42) is further designed such that it assures a special service quality for special internet connections in accordance with the service parameters transferred from the domain manager (12).

8. A system according to claim 7, characterised in that each domain boundary controller (41, 42) is further designed such that by means of memory management it assures a special traffic quality, in particular constant bit rate, maximum delay and jitter, as service quality for special internet connections in accordance with the service parameters.

9. A system according to claim 1, characterised in that each domain boundary controller (41, 42) is further designed such that it provides security functions and assures a special security quality as service quality for special internet connections in accordance with the service parameters.

10. A system according to claim 1, characterised in that the system is based on a TINA platform and the domain manager (12) is further designed such that it provides the function of a component within a TINA architecture which communicates with other components (221, 222, 223, 240) in accordance with the TINA architecture to provide the service quality for internet connections.

11. A domain manager (12) for supporting the management of internet connections routed across an internet communications network (10) comprising two or more domains (21 to 24), characterised in that the domain manager (12) is designed such that it manages the service quality of internet connections within a domain (22), which it is assigned, of the internet communications network (10), that the domain manager (12) is further designed such that, to assure the service quality of internet connections, it communicates with one or more domain boundary controller(s) (41, 42) of its assigned domain (22), which serve to monitor the domain boundary of its assigned domain (22), and that the domain manager (12) is further designed such that, by transferring service parameters, it authorises these domain boundary controllers (41, 42) to permit the establishment and maintenance of special internet connections under special conditions across the boundary of the domain (22) into the domain.

12. A domain manager (12) according to claim 11, characterised in that the domain manager (12) is constructed from a plurality of hierarchically structured sub-domain managers (121 to 124).

13. A domain manager (12) according to claim 11, characterised in that the domain manager (12) is further designed such that by means of a first protocol it communicates with other domain managers (11, 13) assigned to other domains (21, 22) and by means of a second, different type of protocol communicates with the domain boundary controllers (41, 42) of the domain which it is assigned.

14. A domain boundary controller (41, 42) for supporting the management of internet connections routed across an internet communications network (10) comprising two or more domains (21 to 24), characterised in that the domain boundary controller (41, 42) is designed such that it monitors the boundary of a domain (22), which it is assigned, of the internet communications network (10) and communicates with a domain manager (12) of the assigned domain (22) which manages the service quality of internet connections within the assigned domain (22), and that the domain boundary controller (41, 42) is further designed such that it monitors the establishment of internet connections across the boundary of the assigned domain (22) into the assigned domain and permits the establishment and maintenance of internet connections across the boundary of the assigned domain (22) into the assigned domain only for those special internet connections, and under those special conditions, for which it has been authorised by the domain manager (12) of the assigned domain (22).

15. A domain boundary controller according to claim 14, characterised in that it is constructed from a plurality of distributed units.

* * * * *